US008913075B2

(12) United States Patent
Kojima

(10) Patent No.: US 8,913,075 B2
(45) Date of Patent: Dec. 16, 2014

(54) IMAGE DISPLAY APPARATUS, IMAGE PROCESSING APPARATUS, IMAGE PROCESSING METHOD, AND IMAGE PROCESSING METHOD

(75) Inventor: Naoki Kojima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 928 days.

(21) Appl. No.: 13/078,244

(22) Filed: Apr. 1, 2011

(65) Prior Publication Data

US 2011/0254854 A1 Oct. 20, 2011

(30) Foreign Application Priority Data

Apr. 15, 2010 (JP) ................................ 2010-094484

(51) Int. Cl.

| | |
|---|---|
| ***G09G 5/00*** | (2006.01) |
| ***G09G 5/02*** | (2006.01) |
| ***G09G 3/30*** | (2006.01) |
| ***G09G 5/36*** | (2006.01) |
| ***G06K 9/40*** | (2006.01) |
| ***G06K 9/36*** | (2006.01) |
| ***H04N 7/12*** | (2006.01) |
| ***H04N 7/14*** | (2006.01) |
| ***H04N 5/57*** | (2006.01) |
| ***H04N 9/64*** | (2006.01) |
| ***G09G 3/36*** | (2006.01) |

(52) U.S. Cl.

CPC .......... *G09G 3/3648* (2013.01); *G09G 2340/16* (2013.01); *G09G 2320/0261* (2013.01)

USPC ........... 345/589; 345/606; 345/547; 345/690; 345/77; 375/240.01; 382/274; 382/276; 348/14.15; 348/687; 348/700; 348/715

(58) Field of Classification Search

CPC combination set(s) only.
See application file for complete search history.

(56) References Cited

U.S. PATENT DOCUMENTS

| | | | | |
|---|---|---|---|---|
| 6,501,451 | B1 | 12/2002 | Sakashita | |
| 7,239,298 | B2 | 7/2007 | Adachi et al. | |
| 7,782,288 | B2 | 8/2010 | Adachi et al. | |
| 2003/0038768 | A1 | 2/2003 | Sakashita | |
| 2004/0125064 | A1 | 7/2004 | Adachi et al. | |
| 2005/0025361 | A1* | 2/2005 | Gadre et al. | 382/181 |
| 2007/0222731 | A1 | 9/2007 | Adachi et al. | |
| 2007/0273787 | A1* | 11/2007 | Ogino et al. | 348/441 |
| 2008/0107186 | A1* | 5/2008 | Brusnitsyn et al. | 375/240.28 |

(Continued)

FOREIGN PATENT DOCUMENTS

| | | |
|---|---|---|
| JP | 7-129133 A | 5/1995 |
| JP | 3305240 | 5/2002 |

(Continued)

OTHER PUBLICATIONS

Japanese Office Action dated Sep. 27, 2013, issued in counterpart Japanese Application No. 2010-094484, and English-language translation thereof.

*Primary Examiner* — Wesner Sajous

(74) *Attorney, Agent, or Firm* — Fitzpatrick, Cella, Harper & Scinto

(57) ABSTRACT

An adder adds, to a luminance value indicated by the image signal of the nth frame, a correction value corresponding to a combination of a luminance value indicated by the image signal of the nth frame and one indicated by the image signal of the (n+1)th frame. The adder outputs an image signal having the luminance value after addition as the image signal of the nth frame.

13 Claims, 9 Drawing Sheets

(56) References Cited

U.S. PATENT DOCUMENTS

| | | | | |
|---|---|---|---|---|
| 2008/0205783 | A1* | 8/2008 | Sandrew | 382/254 |
| 2009/0086814 | A1* | 4/2009 | Leontaris et al. | 375/240.02 |
| 2009/0109135 | A1 | 4/2009 | Ooishi et al. | |
| 2009/0309890 | A1 | 12/2009 | Mizuno et al. | |
| 2010/0034272 | A1* | 2/2010 | Miyazaki et al. | 375/240.16 |
| 2011/0001874 | A1 | 1/2011 | Ohta et al. | |
| 2012/0275514 | A1* | 11/2012 | Leontaris et al. | 375/240.02 |

FOREIGN PATENT DOCUMENTS

| | | | |
|---|---|---|---|
| JP | 2004-246312 | | 9/2004 |
| JP | 2009-109694 | A | 5/2009 |
| JP | 2009-300786 | A | 12/2009 |
| WO | 2009/107331 | A1 | 9/2009 |

* cited by examiner

FIG. 10

| | | IMAGE SIGNAL OF mTH FRAME | | | | | | | |
|---|---|---|---|---|---|---|---|---|---|
| | | 0~31 | 32~63 | 64~95 | 96~127 | 128~159 | 160~191 | 192~223 | 224~255 |
| IMAGE SIGNAL OF (m-1)TH FRAME | 0~31 | 0 | 0 | 1 | 1 | 1 | 1 | 1 | 1 |
| | 32~63 | 1 | 0 | 0 | 0 | 1 | 1 | 1 | 1 |
| | 64~95 | 1 | 0 | 0 | 0 | 0 | 1 | 1 | 1 |
| | 96~127 | 1 | 1 | 0 | 0 | 0 | 1 | 1 | 1 |
| | 128~159 | 1 | 1 | 0 | 0 | 0 | 0 | 1 | 1 |
| | 160~191 | 1 | 1 | 1 | 0 | 0 | 0 | 0 | 1 |
| | 192~223 | 1 | 1 | 1 | 1 | 1 | 0 | 0 | 1 |
| | 224~255 | 1 | 1 | 1 | 1 | 1 | 1 | 0 | 0 |

FIG. 11

| | | IMAGE SIGNAL OF mTH FRAME | | | | | | | |
|---|---|---|---|---|---|---|---|---|---|
| | | 0~31 | 32~63 | 64~95 | 96~127 | 128~159 | 160~191 | 192~223 | 224~255 |
| IMAGE SIGNAL OF (m-1)TH FRAME | 0~31 | 0 | 0 | 20 | 30 | 30 | 40 | 50 | 70 |
| | 32~63 | -10 | 0 | 0 | 0 | 20 | 30 | 40 | 60 |
| | 64~95 | -20 | 0 | 0 | 0 | 0 | 20 | 30 | 50 |
| | 96~127 | -30 | -20 | 0 | 0 | 0 | 10 | 20 | 40 |
| | 128~159 | -40 | -30 | 0 | 0 | 0 | 0 | 10 | 30 |
| | 160~191 | -50 | -40 | -30 | 0 | 0 | 0 | 0 | 20 |
| | 192~223 | -60 | -50 | -40 | -30 | -30 | 0 | 0 | 10 |
| | 224~255 | -70 | -60 | -50 | -40 | -30 | -30 | 0 | 0 |

IMAGE DISPLAY APPARATUS, IMAGE PROCESSING APPARATUS, IMAGE PROCESSING METHOD, AND IMAGE PROCESSING METHOD

BACKGROUND OF THE INVENTION

1. Field of the Invention

The present invention relates to an image display technique.

2. Description of the Related Art

A liquid crystal display apparatus (for example, direct view type liquid crystal display apparatus or liquid crystal projector) adjusts the quantity of light always emitted by a light source using a liquid crystal shutter, and is called a hold type display apparatus. The hold type display apparatus emits light in one frame period.

To improve the moving image quality in a liquid crystal display apparatus using a reflective liquid crystal, it is necessary that transition of the liquid crystal is completed within one frame period and the reflectance of every frame reaches a predetermined one. However, at a low liquid crystal response speed, the transition of the liquid crystal is not completed within one frame period, failing in display at a predetermined reflectance. To increase the liquid crystal response speed, there is proposed a method of comparing a video signal to be displayed in the current frame with one displayed in an immediately preceding frame, correcting the video signal to be displayed in the current frame in accordance with the comparison result, and driving the liquid crystal display (patent literature 1 (Japanese Patent No. 3305240)). This method is a so-called overdrive method.

However, the overdrive method has a problem that no desired correction can be done near the maximum and minimum gray levels and the reflectance cannot reach a predetermined one. The vicinity of the maximum gray level will be exemplified. Assume that an immediately preceding frame has a gray level of 240 (8 bits), the current frame has a gray level of 255 (8 bits), and the amount of correction by the overdrive method is 16 (8 bits). In this case, the current frame has the gray level of 255 (8 bits), so no more correction can be performed in the positive direction. As a result, the current frame cannot obtain a reflectance corresponding to the gray level of 255 (8 bits).

To solve this problem, patent literature 2 (Japanese Patent Laid-Open No. 2004-246312) discloses the following technique. More specifically, patent literature 2 discloses a technique of, when a predetermined reflectance cannot be obtained in the current frame, predicting the ultimate reflectance, and calculating an overdrive value in the next frame from the predicted ultimate reflectance to prevent the influence on the next frame.

However, the technique in patent literature 2 prevents the influence of a failure to obtain a predetermined reflectance on the next frame, but is not intended to make the liquid crystal accurately reach reflectances corresponding to the maximum and minimum gray levels.

SUMMARY OF THE INVENTION

The present invention has been made to overcome the conventional drawbacks, and provides a technique capable of displaying almost maximum and minimum luminance values even when displaying a moving image.

According to one aspect of the present invention, there is provided an image display apparatus comprising: a holding unit that holds, for each combination of a possible luminance value of an image signal of a preceding frame to be reproduced first out of two adjacent frames and a possible luminance value of an image signal of a succeeding frame to be reproduced later out of the two frames, a correction value used to correct a luminance value indicated by the image signal of the preceding frame to make the luminance value indicated by the image signal of the preceding frame come close to a luminance value indicated by the image signal of the succeeding frame; a first acquisition unit that acquires image signals of successive frames; a second acquisition unit that acquires, from the holding unit, a correction value corresponding to a combination of a luminance value indicated by an image signal of an nth (n is a natural number of not smaller than 1) frame acquired at the nth turn by the first acquisition unit and a luminance value indicated by an image signal of an (n+1)th frame acquired at the (n+1)th turn by the first acquisition unit; and an output unit that adds the correction value acquired by the second acquisition unit to the luminance value indicated by the image signal of the nth frame, and outputs an image signal having a luminance value after addition as an image signal of the nth frame.

According to another aspect of the present invention, there is provided an image display method performed by an image display apparatus including a holding unit that holds, for each combination of a possible luminance value of an image signal of a preceding frame to be reproduced first out of two adjacent frames and a possible luminance value of an image signal of a succeeding frame to be reproduced later out of the two frames, a correction value used to correct a luminance value indicated by the image signal of the preceding frame to make the luminance value indicated by the image signal of the preceding frame come close to a luminance value indicated by the image signal of the succeeding frame, the method comprising: a first acquisition step of acquiring image signals of successive frames; a second acquisition step of acquiring, from the holding unit, a correction value corresponding to a combination of a luminance value indicated by an image signal of an nth (n is a natural number of not smaller than 1) frame acquired at the nth turn in the first acquisition step and a luminance value indicated by an image signal of an (n+1)th frame acquired at the (n+1)th turn in the first acquisition step; and an output step of adding the correction value acquired in the second acquisition step to the luminance value indicated by the image signal of the nth frame, and outputting an image signal having a luminance value after addition as an image signal of the nth frame.

According to still another aspect of the present invention, there is provided an image processing apparatus comprising: an input unit which inputs image signals of successive frames; a correction unit which corrects, based on a luminance value indicated by an image signal of a preceding frame out of two adjacent frames in the frames and a luminance value indicated by an image signal of a succeeding frame, the luminance value indicated by the image signal of the preceding frame to make the luminance value indicated by the image signal of the preceding frame come close to the luminance value indicated by the image signal of the succeeding frame; and an output unit which outputs the image signal of the preceding frame having the luminance value corrected by the correction unit.

According to yet another aspect of the present invention, there is provided an image processing method comprising: an input step of inputting image signals of successive frames; a correction step of correcting, based on a luminance value indicated by an image signal of a preceding frame out of two adjacent frames in the frames and a luminance value indicated by an image signal of a succeeding frame, the luminance value indicated by the image signal of the preceding frame to make the luminance value indicated by the image signal of the preceding frame come close to the luminance value indicated by the image signal of the succeeding frame; and an output step of outputting the image signal of the preceding frame having the luminance value corrected in the correction step.

Further features of the present invention will become apparent from the following description of exemplary embodiments with reference to the attached drawings.

BRIEF DESCRIPTION OF THE DRAWINGS

FIG. 10 is a table exemplifying the structure of flag table information; and FIG. 11 is a table exemplifying the structure of correction value table information.

DESCRIPTION OF THE EMBODIMENTS

Embodiments of the present invention will now be described with reference to the accompanying drawings. Note that the following embodiments are examples of practicing the present invention, and are concrete examples of building components described in the appended claims.

First Embodiment

Figure 1:
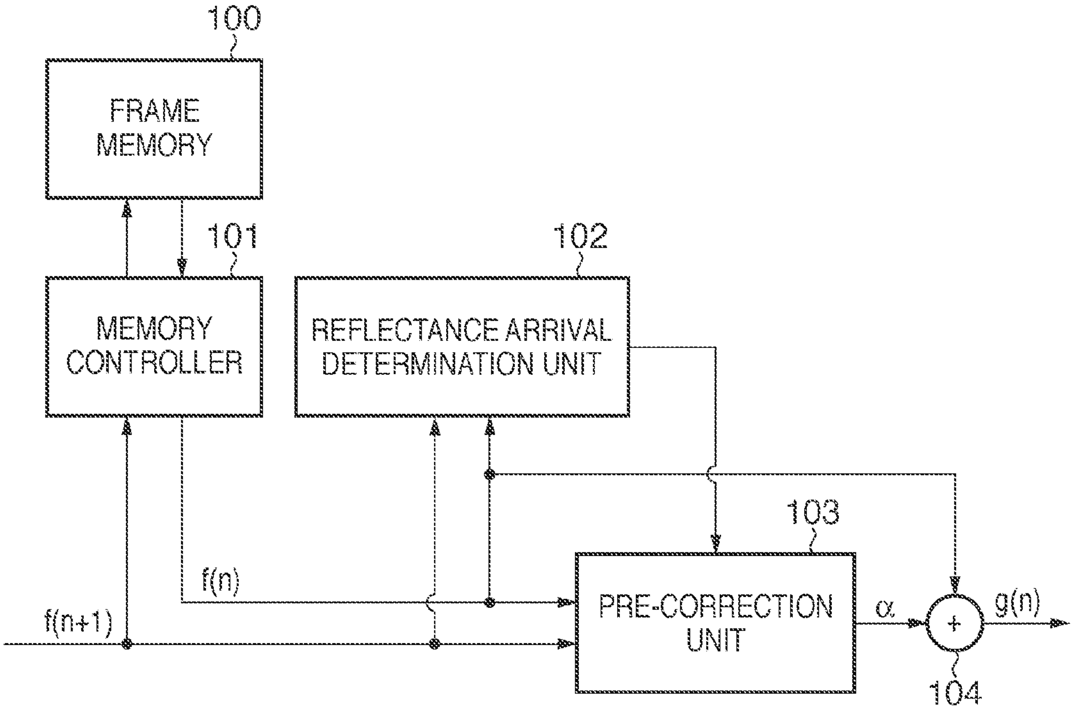
FIG. 1 is a block diagram exemplifying the functional arrangement of an image display apparatus.

The functional arrangement of an image display apparatus according to the first embodiment will be exemplified with reference to the block diagram of FIG. 1. The first embodiment will describe a reflective liquid crystal display apparatus as the image display apparatus.

The image display apparatus receives the image signals f(n) (n is an index (natural number) of 1 or more indicating the frame number) of successive frames in the reproduction order. The image display apparatus processes the input image signal and generates a voltage V(f(n)) corresponding to the processed image signal. When the image display apparatus applies the voltage V(f(n)) to a liquid crystal screen arranged in (or connected to) the image display apparatus, the liquid crystal screen changes to a given steady state corresponding to the applied voltage V(f(n)). A reflectance in the "given steady state" will be defined as R(f(n)).

A memory controller 101, a reflectance arrival determination unit 102, and a pre-correction unit 103 receive the image signals of successive frames in the reproduction order (first acquisition). A case in which the image signal f(n+1) of the (n+1)th frame is input will be explained.

The memory controller 101 stores a luminance value indicated by the received image signal f(n+1) in a frame memory 100. The frame memory 100 stores luminance values indicated by the image signals of frames input in the past. The memory controller 101 reads out a luminance value indicated by the image signal f(n) from the frame memory 100, and outputs the readout luminance value to the reflectance arrival determination unit 102, the pre-correction unit 103, and an adder 104.

The reflectance arrival determination unit 102 executes the following processing using the image signals f(n+1) and f(n). More specifically, when the voltage changes from the voltage V(f(n)) to the voltage V(f(n+1)), the reflectance arrival determination unit 102 determines whether the transition from the reflectance R(f(n)) to the reflectance R(f(n+1)) within a period (one frame period) permitted for the (n+1)th frame is possible. Although this determination can adopt various methods, a determination method using a lookup table (flag table information) will be explained as an example of the determination method.

Assume that the possible luminance value range of the image signal is 0 to 255 (that is, the luminance value is given by 8 bits). In flag table information of FIG. 10, the possible luminance value range of 0 to 255 of the image signal of the mth frame is divided into eight ranges of 0 to 31, 32 to 63, 64 to 95, 96 to 127, 128 to 159, 160 to 191, 192 to 223, and 224 to 255. Similarly, the possible luminance value range of 0 to 255 of the image signal of the (m−1)th frame is divided into eight ranges of 0 to 31, 32 to 63, 64 to 95, 96 to 127, 128 to 159, 160 to 191, 192 to 223, and 224 to 255. Flag values indicating whether transition is possible are registered (held) for respective combinations of the eight divided ranges for the mth frame and those for the (m−1)th frame. A flag value "0" means that transition is possible, and a flag value "1" means that transition is impossible.

The flag table information is created based on the result of actually measuring transition of the liquid crystal screen in advance. In FIG. 10, the range division count is "8", but is not limited to this.

That is, it suffices to register corresponding flag values in the flag table information for respective combinations of all possible luminance values of the image signal of a preceding frame to be reproduced first out of two adjacent frames and all possible luminance values of the image signal of a succeeding frame to be reproduced later. The "corresponding flag value" suffices to have the following characteristic. More specifically, when the absolute value of the difference value between a luminance value indicated by the image signal of a preceding frame and one indicated by the image signal of a succeeding frame is smaller than a threshold, a flag value corresponding to the combination of the luminance value indicated by the image signal of the preceding frame and one indicated by the image signal of the succeeding frame is "0". When the absolute value of the difference value between a luminance value indicated by the image signal of a preceding frame and one indicated by the image signal of a succeeding frame is equal to or larger than the threshold, a flag value corresponding to the combination of the luminance value indicated by the image signal of the preceding frame and one indicated by the image signal of the succeeding frame is "1". The flag table information can adopt any implementation as long as it has the above characteristic. The flag table information is held in the reflectance arrival determination unit 102 or a memory accessible by the reflectance arrival determination unit 102 in the image display apparatus (second holding).

The operation of the reflectance arrival determination unit 102 will be exemplified. Assume that a luminance value indicated by the image signal of the (n+1)th frame is "100", and one indicated by the image signal of the nth frame is "20". In this case, the reflectance arrival determination unit 102 obtains a corresponding flag value "1" by looking up the flag table information in FIG. 10, and determines that transition from the reflectance R(f(n)) to the reflectance R(f(n+1)) within one frame period is impossible. In contrast, assume that a luminance value indicated by the image signal of the (n+1)th frame is "33", and one indicated by the image signal of the nth frame is "30". In this case, the reflectance arrival determination unit 102 obtains a flag value "0" by looking up the flag table information in FIG. 10, and determines that transition from the reflectance R(f(n)) to the reflectance R(f(n+1)) within one frame period is possible.

By looking up the flag table information using the image signals f(n+1) and f(n), the reflectance arrival determination unit 102 determines whether transition from the reflectance R(f(n)) to the reflectance R(f(n+1)) within one frame period is possible. The reflectance arrival determination unit 102 notifies the pre-correction unit 103 of the determination result.

Based on the notification from the reflectance arrival determination unit 102, the pre-correction unit 103 determines a correction value α for the image signal f(n) (second acquisition). When the notification from the reflectance arrival determination unit 102 represents that "transition is impossible", the pre-correction unit 103 determines a correction value corresponding to a combination of the image signals f(n+1) and f(n) as the correction value α for the image signal f(n). When the notification from the reflectance arrival determination unit 102 represents that "transition is possible", the pre-correction unit 103 determines "0" as the correction value α for the image signal f(n). In other words, the notification content from the reflectance arrival determination unit 102 is a notification representing whether to perform correction.

The correction value α satisfies a voltage V(f(n)+α) at which the reflectance can reach from the reflectance R(f(n)) to the reflectance R(f(n+1)). Although the correction value α can be determined by various methods, a determination method using a lookup table (correction value table information) will be explained as an example of the determination method.

In correction value table information of FIG. 11, the possible luminance value range of 0 to 255 of the image signal of the mth frame is divided into eight ranges of 0 to 31, 32 to 63, 64 to 95, 96 to 127, 128 to 159, 160 to 191, 192 to 223, and 224 to 255. Similarly, the possible luminance value range of 0 to 255 of the image signal of the (m−1)th frame is divided into eight ranges of 0 to 31, 32 to 63, 64 to 95, 96 to 127, 128 to 159, 160 to 191, 192 to 223, and 224 to 255. Corresponding correction values α are registered (held) for respective combinations of the eight divided ranges for the mth frame and those for the (m−1)th frame.

The correction value table information is created based on the result of actually measuring transition of the liquid crystal screen in advance. In FIG. 11, the range division count is "8", but is not limited to this.

That is, it suffices to register corresponding correction values in the correction value table information for respective combinations of all possible luminance values of the image signal of a preceding frame to be reproduced first out of two adjacent frames and all possible luminance values of the image signal of a succeeding frame to be reproduced later. Each registered correction value suffices to be used to correct a luminance value indicated by the image signal of a preceding frame so that the luminance value indicated by the image signal of the preceding frame comes close to one indicated by the image signal of a succeeding frame. For this purpose, the correction value has the following characteristic. More specifically, the absolute value of the correction value becomes larger for a larger absolute value of the difference value between a luminance value indicated by the image signal of a preceding frame and one indicated by the image signal of a succeeding frame. In addition, the absolute value of the correction value becomes smaller for a smaller absolute value of the difference value between a luminance value indicated by the image signal of a preceding frame and one indicated by the image signal of a succeeding frame. The correction value table information can employ any implementation as long as it has the above characteristic. The correction value table information is held in the pre-correction unit 103 or a memory accessible by the pre-correction unit 103 in the image display apparatus.

The operation of the pre-correction unit 103 will be exemplified. Assume that a luminance value indicated by the image signal of the (n+1)th frame is "100", and one indicated by the image signal of the nth frame is "20". In this case, the reflectance arrival determination unit 102 determines that transition from the reflectance R(f(n)) to the reflectance R(f(n+1)) within one frame period is impossible, as described above. The pre-correction unit 103 specifies, from the correction value table information of FIG. 11 as a correction amount for correcting the luminance value indicated by the image signal f(n), a correction value α=30 corresponding to a combination of the luminance value of the image signal f(n+1) and that of the image signal f(n). To the contrary, assume that a luminance value indicated by the image signal of the (n+1)th frame is "33", and one indicated by the image signal of the nth frame is "30". In this case, the reflectance arrival determination unit 102 determines that transition from the reflectance R(f(n)) to the reflectance R(f(n+1)) within one frame period is possible, as described above. Thus, the pre-correction unit 103 determines "0" as the correction amount a for correcting the luminance value indicated by the image signal f(n).

As described above, the flag value indicates whether transition is possible. However, from the above description, the flag value can also be interpreted as a flag value indicating whether to correct the luminance value. Based on this interpretation, if the flag value indicates "not to perform correction" (indicates that transition is possible), the correction value is set to "0". If the flag value indicates "to perform correction" (indicates that transition is impossible), a correction value corresponding to a combination of the luminance value of the image signal f(n+1) and that of the image signal f(n) is set as a correction value for the image signal f(n).

The pre-correction unit 103 notifies the adder 104 at the subsequent stage of the determined correction value α. The adder 104 adds the correction value α to a luminance value indicated by the image signal f(n), and outputs an image signal g(n) having the luminance value after addition as the image signal of the nth frame.

Figure 2:
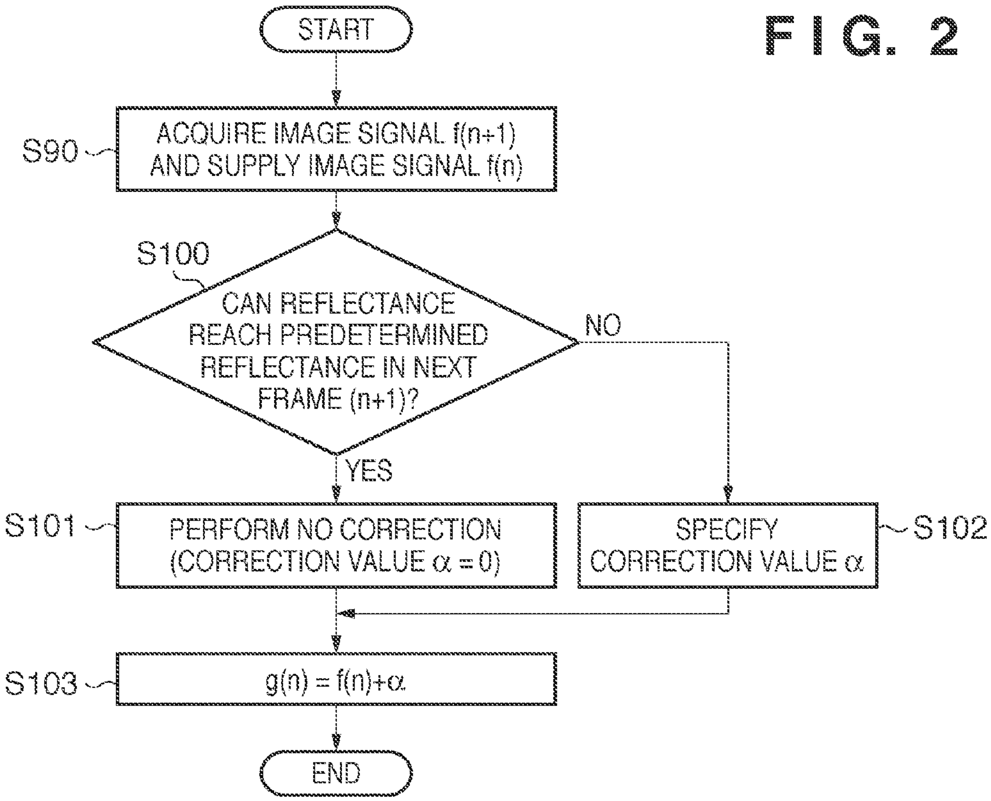
FIG. 2 is a flowchart showing processing executed to output the image signal of the nth frame.

Processing executed by the image display apparatus according to the first embodiment to output the image signal of the nth frame will be explained with reference to FIG. 2 which is a flowchart of this processing. To output the image signal of each frame, processing according to the flowchart of FIG. 2 is performed for each frame.

As described above, the memory controller 101, the reflectance arrival determination unit 102, and the pre-correction unit 103 receive the image signal f(n+1). In step S90, the memory controller 101 stores a luminance value indicated by the received image signal f(n+1) in the frame memory 100, and reads out a luminance value indicated by the image signal f(n) from the frame memory 100. The memory controller 101 outputs (supplies) the readout luminance value to the reflectance arrival determination unit 102, the pre-correction unit 103, and the adder 104.

In step S100, by looking up the flag table information using the image signals f(n+1) and f(n), the reflectance arrival determination unit 102 determines whether transition from the reflectance R(f(n)) to the reflectance R(f(n+1)) within one frame period is possible. The reflectance arrival determination unit 102 notifies the pre-correction unit 103 of the determination result. If the reflectance arrival determination unit 102 determines that the transition is possible, the process advances to step S101; if it determines that the transition is impossible, to step S102.

In step S101, the pre-correction unit 103 determines "0" as the correction value α for the image signal f(n). The pre-correction unit 103 notifies the adder 104 at the succeeding stage of the determined correction value α.

In step S102, the pre-correction unit 103 specifies a corresponding correction value by looking up the correction value table information using the image signals f(n+1) and f(n), and sets the specified correction value as a correction value used to correct the luminance value of the image signal f(n). The pre-correction unit 103 notifies the adder 104 at the succeeding stage of the determined correction value α.

In step S103, the adder 104 adds the correction value α to the luminance value indicated by the image signal f(n), and outputs the image signal g(n) having the luminance value after addition as the image signal of the nth frame.

Figure 3:
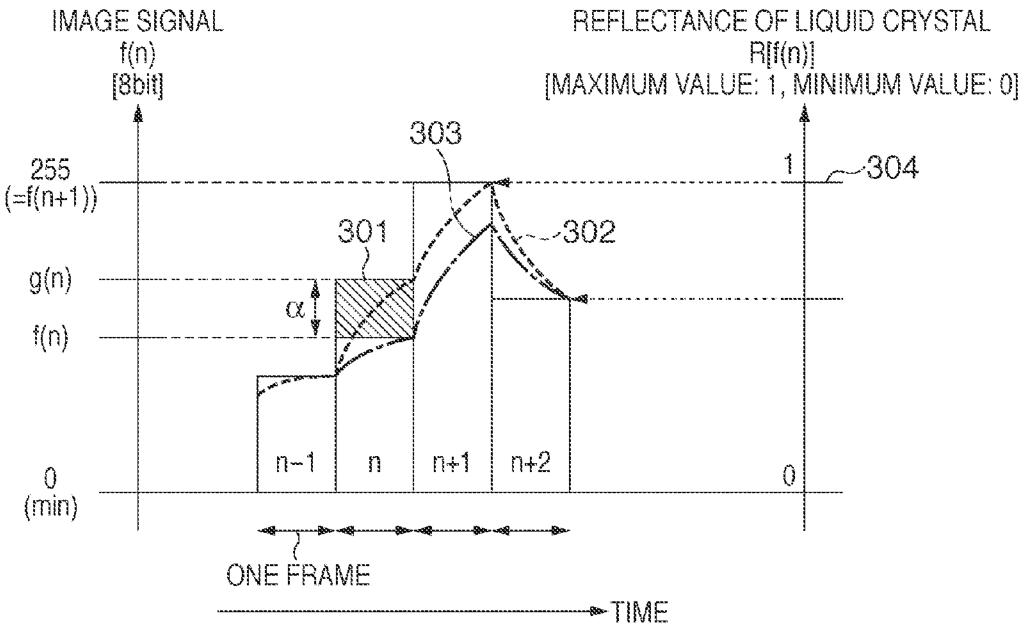
FIG. 3 is a graph for illustrating luminance value correction processing.

The luminance value correction processing for the image signal f(n) will be explained with reference to the graph of FIG. 3. In the graph of FIG. 3, the abscissa indicates the time n of the frame unit, and the ordinate indicates the luminance value of the image signal f(n) and the reflectance R(f(n)). For descriptive convenience, FIG. 3 shows the luminance value and reflectance for four frames ((n−1)th frame, nth frame, (n+1)th frame, and (n+2)th frame). The graph of FIG. 3 does not show the voltage V(f(n)) applied to the liquid crystal screen because the voltage V(f(n)) is uniquely determined from the image signal f(n).

Even if the image signal f(n) is output in the nth frame, the reflectance transition characteristic of the liquid crystal screen changes in the (n+1)th frame, as indicated by a curve 303, and thus the reflectance does not reach a target reflectance 304 in the (n+1)th frame. For this reason, the image signal g(n) having a luminance value obtained by adding the correction value α to the luminance value of the image signal f(n) is output in the nth frame. Then, the reflectance transition characteristic changes in the (n+1)th frame, as indicated by a curve 302, and the reflectance reaches the target reflectance 304 in the (n+1)th frame. This means that a luminance value corresponding to the reflectance 304 equivalent to the maximum luminance value of the liquid crystal screen can be expressed accurately.

In the first embodiment, the input and output frame rates are arbitrary as long as they are equal to each other. The embodiment has exemplified the reflective liquid crystal display apparatus. However, the embodiment is also applicable to a transmissive liquid crystal display apparatus by applying the above description while replacing the reflectance with the transmittance. Also, the embodiment is applicable to a display apparatus other than the liquid crystal display apparatus as long as the display apparatus can display an image corresponding to an image signal.

<Modification>

In the first embodiment, the reflectance arrival determination unit 102 is used to determine whether to correct the luminance value. However, it is also possible to omit this determination and configure correction value table information in which a correction value corresponding to a combination of image signals not to undergo luminance value correction is set to "0". This modification will be explained by exemplifying the pieces of table information in FIGS. 10 and 11.

For example, in FIG. 10, no correction is done for combinations of the luminance values of 0 to 31 of the image signal of the mth frame and the luminance values of 0 to 31 of the image signal of the (m+1)th frame. Hence, "0" is registered in the correction value table information of FIG. 11 as a correction value corresponding to combinations of the luminance values of 0 to 31 of the image signal of the mth frame and the luminance values of 0 to 31 of the image signal of the (m+1)th frame. Even if a luminance value indicated by the image signal f(n+1) falls within the range of 0 to 31 and that indicated by the image signal f(n) falls within the range of 0 to 31, a corresponding correction value can be set to "0" by looking up the correction value table information. That is, only the correction value table information can implement the determination made by the reflectance arrival determination unit 102.

In this case, the reflectance arrival determination unit 102 (flag table information) is omitted from the image display apparatus, and the pre-correction unit 103 only acquires, from the correction value table information, a correction value corresponding to a combination of the image signals f(n+1) and f(n).

Second Embodiment

Despite luminance value correction by the pre-correction unit 103, it is not easy to obtain a luminance value expected when a frame to be corrected is input. Hence, one or more subframes are generated between two adjacent frames to perform S-time display. In addition, the pre-correction unit 103 executes correction for only the generated subframes, obtaining a more suitable result. That is, subframes can improve the luminance reproduction of an original frame.

Figure 4:
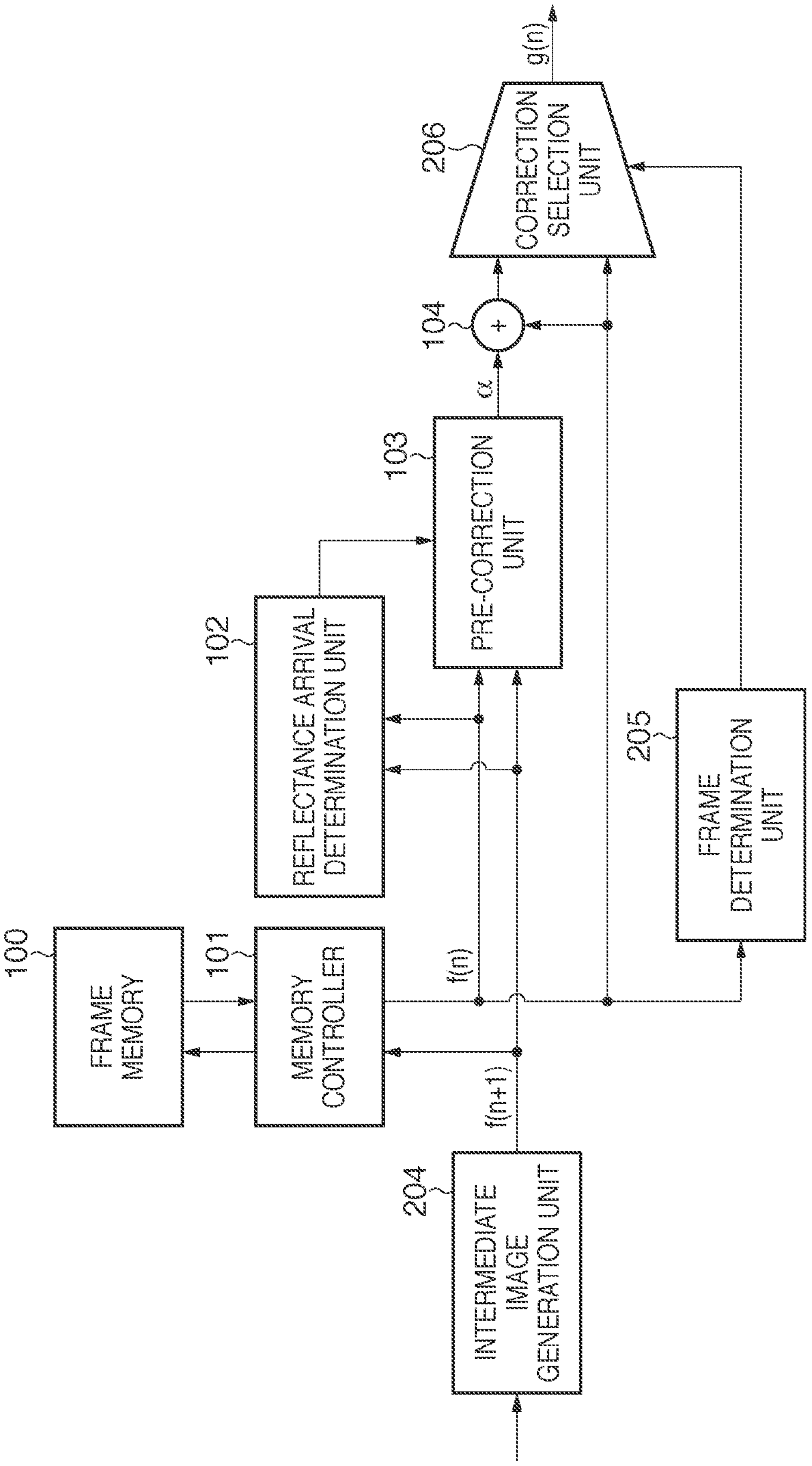
FIG. 4 is a block diagram exemplifying the functional arrangement of an image display apparatus.

The functional arrangement of an image display apparatus according to the second embodiment will be exemplified with reference to the block diagram of FIG. 4. In FIG. 4, the same reference numerals as those in FIG. 1 denote the same parts, and a description thereof will not be repeated. Only a difference from the first embodiment will be described, and the remaining part is the same as the first embodiment.

An intermediate image generation unit 204 receives the image signals of successive frames in the reproduction order. The intermediate image generation unit 204 generates one or more subframes from one frame (original frame). The subframe can be generated by various methods, and any generation method is available in the second embodiment as long as one or more subframes can be generated for one original frame. For example, the image signals of subframes to be reproduced between two adjacent frames may be generated by image interpolation processing using the image signals of the two adjacent frames. Needless to say, the image signal itself of a frame to be reproduced later out of two adjacent frames may be used as the image signal of a subframe to be reproduced between the two adjacent frames.

Further, the intermediate image generation unit 204 adds, to an image signal input to the intermediate image generation unit 204, a bit value "1" indicating an original frame. The intermediate image generation unit 204 adds, to the image signal of a subframe generated from an image signal input to the intermediate image generation unit 204, a bit value "0" indicating a subframe. Note that a method other than the method of adding a bit value is also applicable as long as it can be determined whether the image signal of each frame output from the intermediate image generation unit 204 is the image signal of an original frame or that of a subframe.

The intermediate image generation unit 204 outputs the original frame and one or more subframes in the reproduction order. A case in which the intermediate image generation unit 204 outputs the image signal f(n+1) of the (n+1)th frame to a memory controller 101, a reflectance arrival determination unit 102, and a pre-correction unit 103 will be explained.

Similar to the first embodiment, the memory controller 101 stores a luminance value indicated by the received image signal f(n+1) in a frame memory 100, and reads out the image signal f(n) from the frame memory 100. The memory controller 101 sends the readout image signal f(n) even to a frame determination unit 205 and correction selection unit 206 in addition to the reflectance arrival determination unit 102, the pre-correction unit 103, and an adder 104.

The frame determination unit 205 determines whether the image signal f(n) output from the memory controller 101 is the image signal of an original frame or that of a subframe, and sends the determination result to the correction selection unit 206. For example, when the method of adding a bit value to an image signal is adopted, the frame determination unit 205 refers to the bit value added to the image signal f(n) output from the memory controller 101. If the referred bit value is "1", the frame determination unit 205 determines that the image signal f(n) is the image signal of an original frame. If the referred bit value is "0", the frame determination unit 205 determines that the image signal f(n) is the image signal of a subframe. The frame determination unit 205 sends the determination result to the correction selection unit 206.

The adder 104 sends an image signal g(n) to the correction selection unit 206. If the correction selection unit 206 receives, from the frame determination unit 205, the result of determining that the nth frame is an original frame, it outputs the image signal f(n) received from the memory controller 101 as the image signal g(n) of the nth frame. If the correction selection unit 206 receives, from the frame determination unit 205, the result of determining that the nth frame is a subframe, it outputs the image signal g(n) received from the adder 104 as the image signal g(n) of the nth frame.

Figure 5:
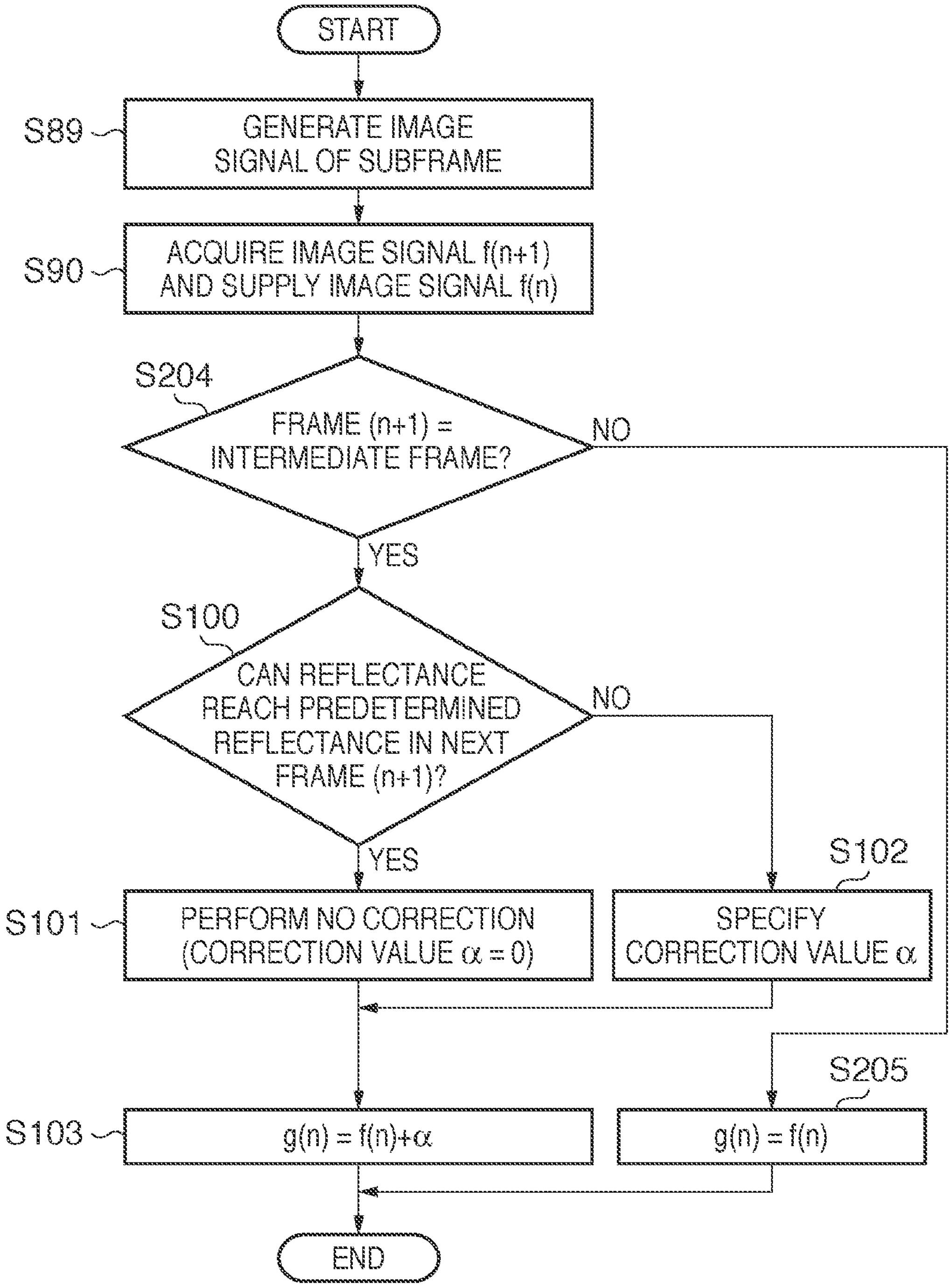
FIG. 5 is a flowchart showing processing executed to output the image signal of the nth frame.

Processing executed by the image display apparatus according to the second embodiment to output the image signal of the nth frame will be explained with reference to FIG. 5 which is a flowchart of this processing. To output the image signal of each frame, processing according to the flowchart of FIG. 5 is performed for each frame. In FIG. 5, the same step numbers as those in FIG. 2 denote the same processes, and a description thereof will not be repeated.

In step S89, the intermediate image generation unit 204 generates the image signals of one or more subframes for the image signal f(n+1) of an input original frame. Then, the intermediate image generation unit 204 sends the image signal of the original frame and those of the subframes in the reproduction order to the memory controller 101, the reflectance arrival determination unit 102, and the pre-correction unit 103 at the subsequent stage.

In step S204, the frame determination unit 205 determines whether the image signal f(n) output from the memory controller 101 is the image signal of an original frame or that of a subframe, and sends the determination result to the correction selection unit 206. If the image signal f(n) output from the memory controller 101 is the image signal of an original frame, the process advances to step S205; if it is the image signal of a subframe, to step S100. In step S205, the correction selection unit 206 outputs the image signal f(n) received from the memory controller 101 as the image signal g(n) of the nth frame.

In the second embodiment, correction processing is done for the image signals of all subframes. However, when the image signals of four subframes are generated between two adjacent original frames, correction processing may be performed for the image signals of not all the four but some subframes.

In the second embodiment, no correction processing is executed for the image signal of an original frame. However, executing correction processing for the image signal of an original frame does not impair the effects according to the second embodiment. For example, the frame memory may be one capable of holding two frames, and the image signal of the (n−1)th frame may be read out via the memory controller to perform correction in gray level transition from the (n−1)th frame to the nth frame.

As described above, according to the second embodiment, an original frame can easily reach a predetermined reflectance by performing the above correction processing for subframes. The second embodiment can therefore provide a high-contrast display apparatus.

Third Embodiment

In the first embodiment, a high-contrast display can be implemented even in moving image display by performing correction (pre-correction) by the pre-correction unit 103. However, the frame itself corrected by the pre-correction unit 103 may not reach a predetermined reflectance. Considering this, a frame corrected by the pre-correction unit 103 undergoes overdrive correction using an immediately preceding frame. Then, correction by the pre-correction unit 103 becomes more accurate, obtaining a high-contrast display. The third embodiment will explain a case in which overdrive correction is further performed after correction by a pre-correction unit 103. Note that only the differences from the first embodiment will be described and remainder is the same as the first embodiment.

Figure 6:
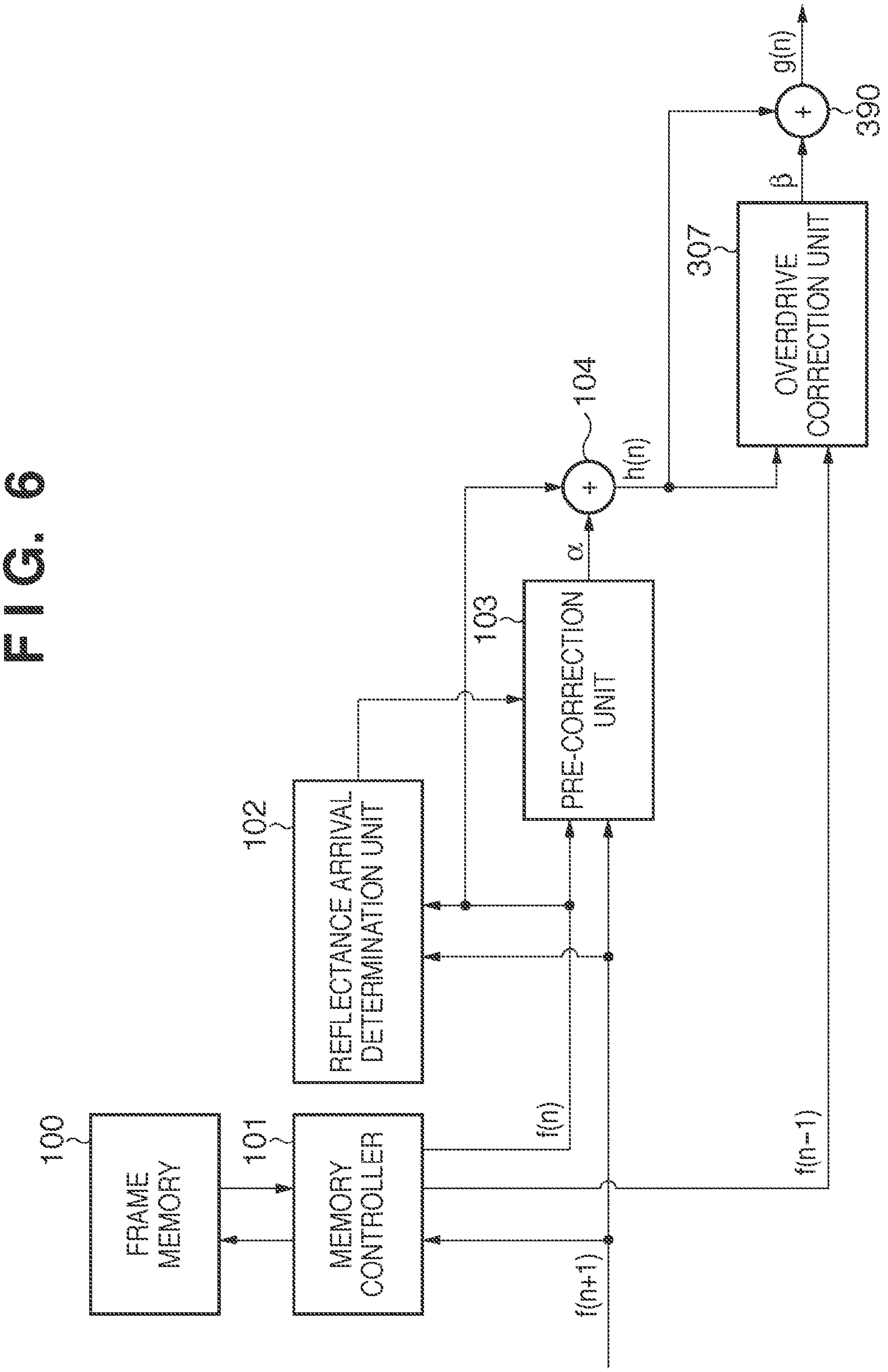
FIG. 6 is a block diagram exemplifying the functional arrangement of an image display apparatus.

The functional arrangement of an image display apparatus according to the third embodiment will be exemplified with reference to the block diagram of FIG. 6. In FIG. 6, the same reference numerals as those in FIG. 1 denote the same parts, and a description thereof will not be repeated. Only the differences from the first embodiment will be described, and the remainder is the same as the first embodiment.

A memory controller 101 stores a received image signal f(n+1) in a frame memory 100, and reads out image signals f(n) and f(n−1) from the frame memory 100. Similar to the first embodiment, the memory controller 101 sends the readout image signal f(n) to a reflectance arrival determination unit 102, the pre-correction unit 103, and an adder 104. The memory controller 101 sends the image signal f(n−1) to an overdrive correction unit 307.

The overdrive correction unit 307 receives an image signal h(n) obtained by the adder 104 in the same way as in the first embodiment, and the image signal f(n−1) from the memory controller 101. The overdrive correction unit 307 specifies a correction value β by which the transition from the reflectance R(f(n−1)) to the reflectance R(f(n)) within the period of the nth frame becomes possible. Although the method of specifying the correction value β is not particularly limited, the method of specifying the correction value α may be directly applied. More specifically, a table in which corresponding correction values β are registered for respective combinations of all possible luminance values of the image signal h(n) and all possible luminance values of the image signal f(n−1) is created in advance. The overdrive correction unit 307 specifies the correction value β using this table. The overdrive correction unit 307 sends the specified correction value β to an adder 390 at the subsequent stage. The adder 390 adds the correction value β to a luminance value indicated by the image signal h(n), and outputs an image signal g(n) having the luminance value after addition as the image signal of the nth frame.

Figure 7:
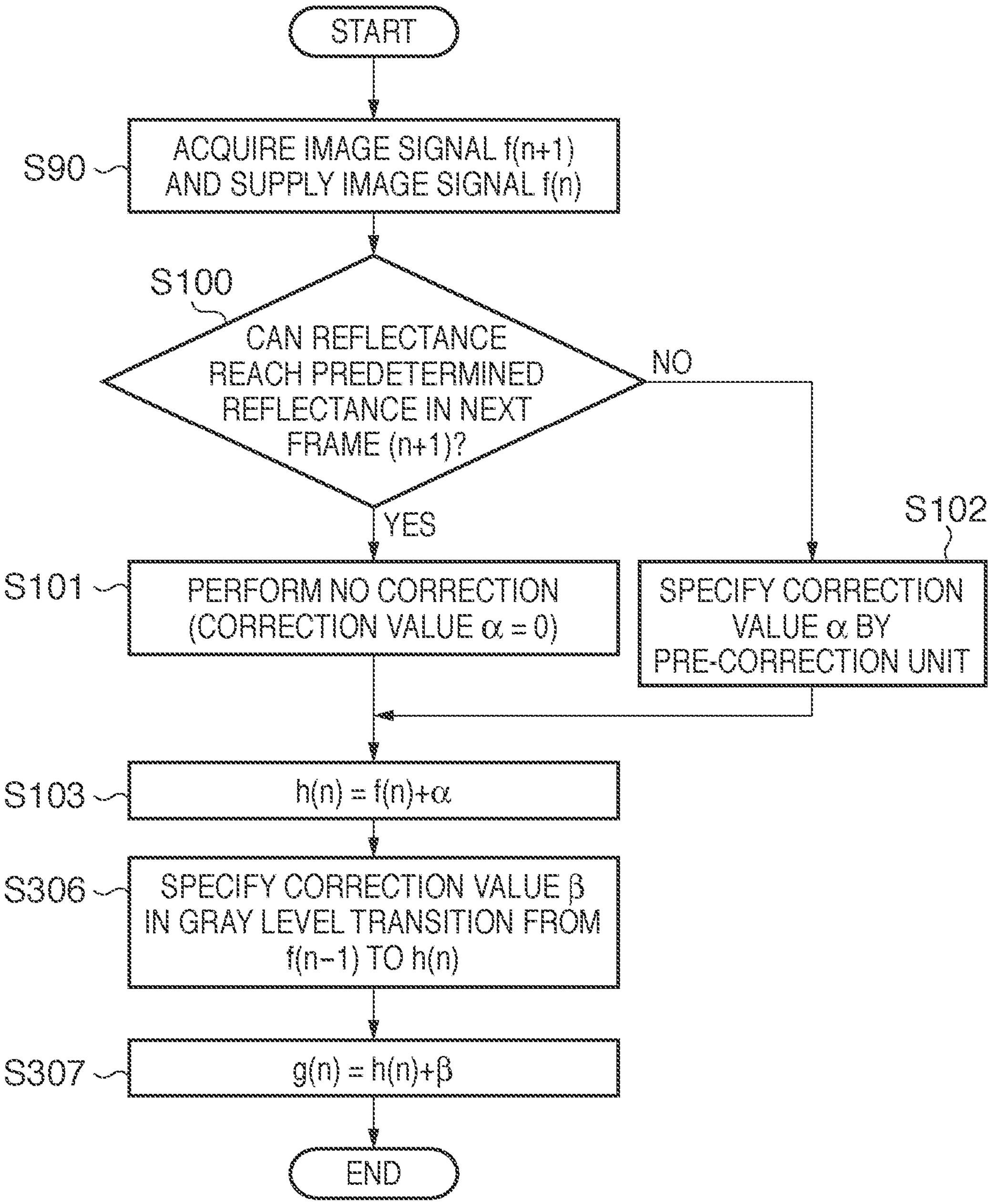
FIG. 7 is a flowchart showing processing executed to output the image signal of the nth frame.

Processing executed by the image display apparatus according to the third embodiment to output the image signal of the nth frame will be explained with reference to FIG. 7 which is a flowchart of this processing. To output the image signal of each frame, processing according to the flowchart of FIG. 7 is performed for each frame. In FIG. 7, the same step numbers as those in FIG. 2 denote the same processes, and a description thereof will not be repeated. Note that an image signal obtained in step S103 will be described as h(n).

In step S306, the overdrive correction unit 307 specifies the correction value β by which the transition from the reflectance R(f(n−1)) to the reflectance R(f(n)) within the period of the nth frame becomes possible. The overdrive correction unit 307 sends the specified correction value β to the adder 390 at the subsequent stage.

In step S307, the adder 390 adds the correction value β to a luminance value indicated by the image signal h(n), and outputs the image signal g(n) having the luminance value after addition as the image signal of the nth frame.

As described above, the third embodiment can implement more accurate pre-correction. The third embodiment enables a high-contrast display by increasing the degree of arrival at a predetermined reflectance, compared to the first embodiment.

Fourth Embodiment

The fourth embodiment will be described as a combination of the second and third embodiments. With this combination, an original frame can increase the degree of arrival at its predetermined reflectance, and a subframe can increase the pre-correction precision. As a consequence, the fourth embodiment can provide a higher-contrast liquid crystal display apparatus when an intermediate image generation function is installed.

Note that only differences from the second and third embodiments will be described, and the remaining part is the same as the second and third embodiments.

Figure 8:
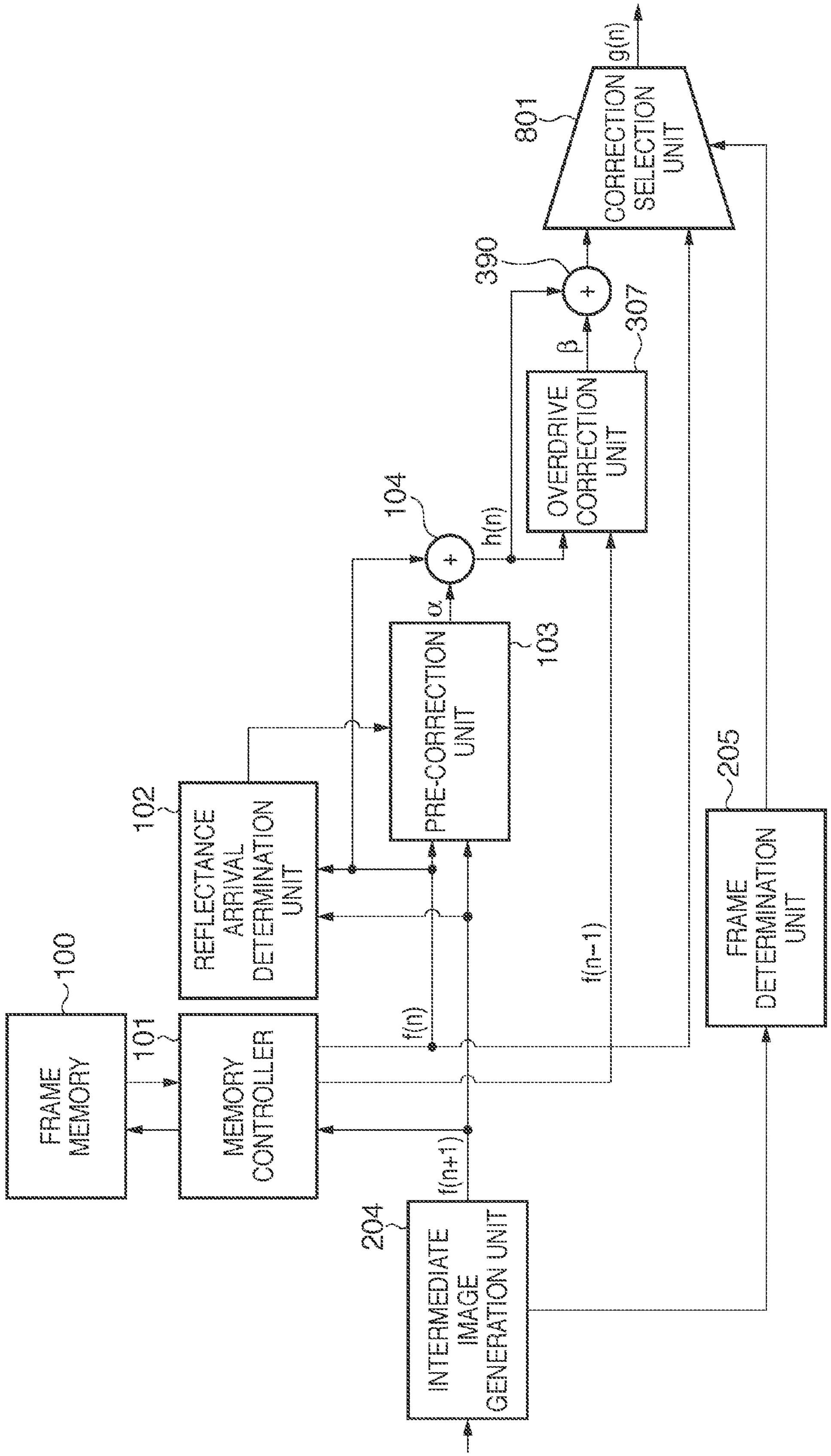
FIG. 8 is a block diagram exemplifying the functional arrangement of an image display apparatus.

The functional arrangement of an image display apparatus according to the fourth embodiment will be exemplified with reference to the block diagram of FIG. 8. In FIG. 8, the same reference numerals as those in FIGS. 4 and 6 denote the same parts, and a description thereof will not be repeated. Only differences from the second and third embodiments will be described, and the remaining part is the same as the second and third embodiments.

When a correction selection unit 801 receives, from a frame determination unit 205, the result of determining that the nth frame is an original frame, it outputs an image signal f(n) received from a memory controller 101 as the image signal g(n) of the nth frame. If the correction selection unit 801 receives, from the frame determination unit 205, the result of determining that the nth frame is a subframe, it outputs an image signal received from an adder 390 as the image signal g(n) of the nth frame.

Figure 9:
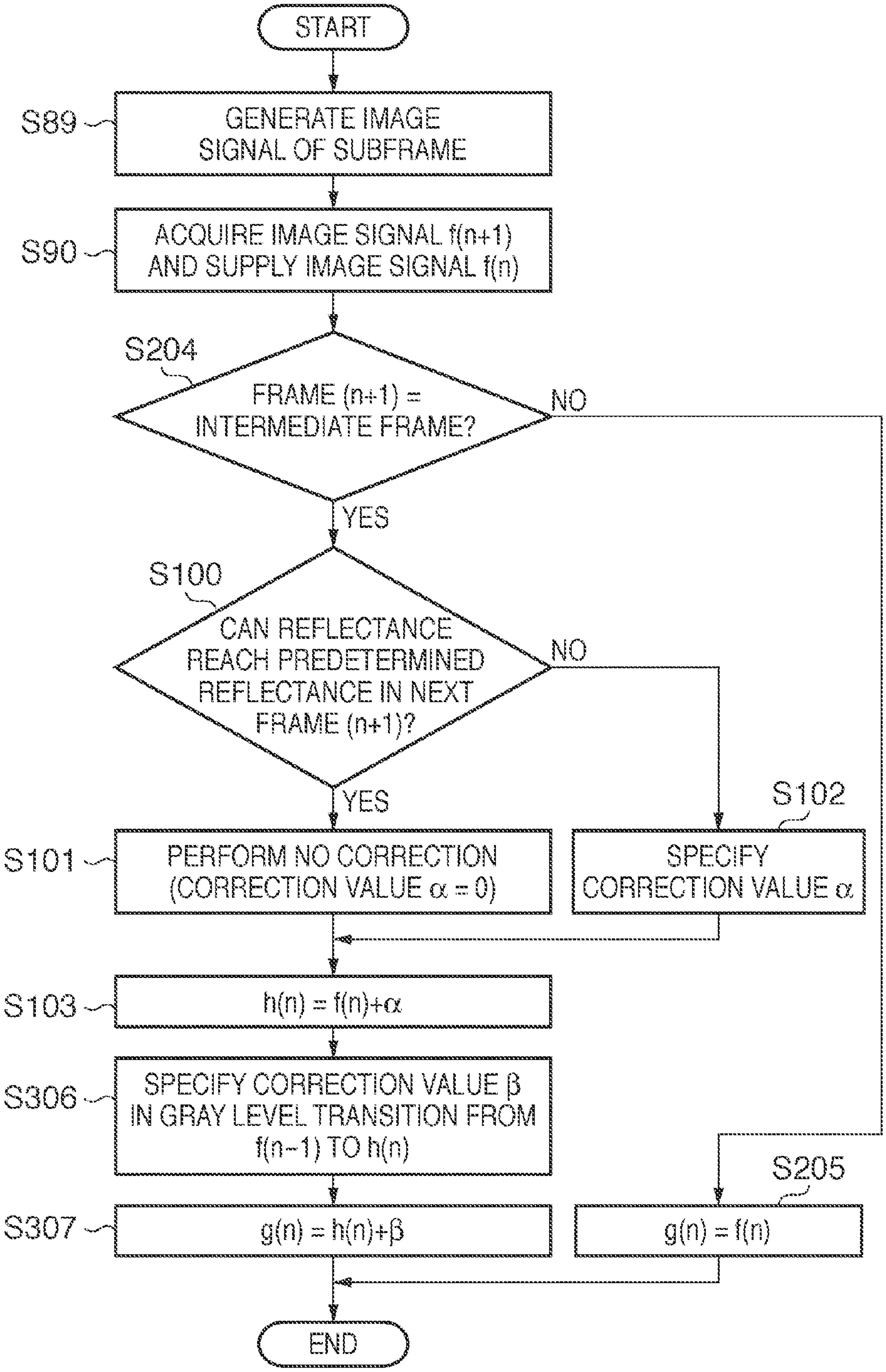
FIG. 9 is a flowchart showing processing executed to output the image signal of the nth frame.

Processing executed by the image display apparatus according to the fourth embodiment to output the image signal of the nth frame is executed according to a combination of the flowcharts shown in FIGS. 1, 5, and 7, as shown in the flowchart of FIG. 9. The sequence of processing according to the flowchart of FIG. 9 has been described above, and a description thereof will not be repeated. Also in the fourth embodiment, neither luminance value correction nor overdrive correction is performed for an original frame, but one or both of them may be done.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-094484 filed Apr. 15, 2010 which is hereby incorporated by reference herein in its entirety.

What is claimed is:

1. An image display apparatus comprising:

a holding unit that holds, for each combination of a possible luminance value of an image signal of a preceding frame to be reproduced first out of two adjacent frames and a possible luminance value of an image signal of a succeeding frame to be reproduced later than the preceding frame out of the two frames, a correction value used to correct a luminance value indicated by the image signal of the preceding frame to make the luminance value indicated by the image signal of the preceding frame more closely match a luminance value indicated by the image signal of the succeeding frame;

a first acquisition unit that acquires image signals of successive frames;

a second acquisition unit that acquires, from said holding unit, a correction value corresponding to a combination of a luminance value indicated by an image signal of an nth (n is a natural number of not smaller than 1) frame acquired at the nth turn by said first acquisition unit and a luminance value indicated by an image signal of an (n+1)th frame acquired at the (n+1)th turn by said first acquisition unit; and an output unit that adds the correction value acquired by said second acquisition unit to the luminance value indicated by the image signal of the nth frame, and outputs an image signal having a luminance value after addition as an image signal of the nth frame.

2. The apparatus according to claim 1, wherein an absolute value of the correction value held by said holding unit becomes larger for a larger absolute value of a difference value between the luminance value indicated by the image signal of the preceding frame and the luminance value indicated by the image signal of the succeeding frame, and becomes smaller for a smaller absolute value of the difference value between the luminance value indicated by the image signal of the preceding frame and the luminance value indicated by the image signal of the succeeding frame.

3. The apparatus according to claim 1, further comprising a second holding unit that holds, for each combination of the possible luminance value of the image signal of the preceding frame and the possible luminance value of the image signal of the succeeding frame, a flag value indicating whether to correct the luminance value indicated by the image signal of the preceding frame, wherein said second acquisition unit includes:

a flag value acquisition unit that acquires, from said second holding unit, a flag value corresponding to the combination of the luminance value indicated by the image signal of the nth frame and the luminance value indicated by the image signal of the (n+1)th frame; and a unit that, when the flag value acquired by said flag value acquisition unit indicates the performing of luminance correction, acquires, from said holding unit, the correction value corresponding to the combination of the luminance value indicated by the image signal of the nth frame and the luminance value indicated by the image signal of the (n+1)th frame, and when the flag value acquired by said flag value acquisition unit indicates that luminance correction is not to be performed, sets, to 0, the correction value used to correct the luminance value indicated by the image signal of the nth frame.

4. The apparatus according to claim 3, wherein when an absolute value of a difference value between the luminance value indicated by the image signal of the preceding frame and the luminance value indicated by the image signal of the succeeding frame is smaller than a threshold, the flag value corresponding to the combination of the luminance value indicated by the image signal of the preceding frame and the luminance value indicated by the image signal of the succeeding frame indicates that the luminance value indicated by the image signal of the preceding frame is not to be corrected, and when the absolute value of the difference value between the luminance value indicated by the image signal of the preceding frame and the luminance value indicated by the image signal of the succeeding frame is not smaller than the threshold, the flag value corresponding to the combination of the luminance value indicated by the image signal of the preceding frame and the luminance value indicated by the image signal of the succeeding frame indicates that the luminance value indicated by the image signal of the preceding frame is to be corrected.

5. The apparatus according to claim 1, wherein the image signals of the successive frames include an image signal of at least one subframe generated for an image signal of one frame, and when the nth frame is an original frame, said output unit outputs an image signal of the nth frame, and when the nth frame is a subframe, said output unit outputs an image signal having the luminance value after addition as the image signal of the nth frame.

6. The apparatus according to claim 1, further comprising a unit that performs overdrive correction for the image signal output from said output unit.

7. An image display method performed by an image display apparatus including a holding unit that holds, for each combination of a possible luminance value of an image signal of a preceding frame to be reproduced first out of two adjacent frames and a possible luminance value of an image signal of a succeeding frame to be reproduced later than the preceding frame out of the two frames, a correction value used to correct a luminance value indicated by the image signal of the preceding frame to make the luminance value indicated by the image signal of the preceding frame more closely match a luminance value indicated by the image signal of the succeeding frame, the method comprising:

a first acquisition step of acquiring image signals of successive frames;

a second acquisition step of acquiring, from the holding unit, a correction value corresponding to a combination of a luminance value indicated by an image signal of an nth (n is a natural number of not smaller than 1) frame acquired at the nth turn in the first acquisition step and a luminance value indicated by an image signal of an (n+1)th frame acquired at the (n+1)th turn in the first acquisition step; and an output step of adding the correction value acquired in the second acquisition step to the luminance value indicated by the image signal of the nth frame, and outputting an image signal having a luminance value after addition as an image signal of the nth frame.

8. A non-transitory computer-readable storage medium storing a computer program for causing a computer to function as each unit of an image display apparatus defined in claim 1.

9. An image processing apparatus comprising:

an input unit which inputs image signals of successive frames;

a correction unit which corrects, based on a luminance value indicated by an image signal of a preceding frame of two adjacent frames in the frames and a luminance value indicated by an image signal of a succeeding frame, the luminance value indicated by the image signal of the preceding frame to make the luminance value indicated by the image signal of the preceding frame more closely match the luminance value indicated by the image signal of the succeeding frame; and an output unit which outputs the image signal of the preceding frame having the luminance value corrected by said correction unit.

10. An image processing method performed by an image processing apparatus including an input unit, a correction unit, and an output unit, the method comprising:

an input step, performed by the input unit, of inputting image signals of successive frames;

a correction step, performed by the correction unit, of correcting, based on a luminance value indicated by an image signal of a preceding frame out of two adjacent frames in the frames and a luminance value indicated by an image signal of a succeeding frame, the luminance value indicated by the image signal of the preceding frame to make the luminance value indicated by the image signal of the preceding frame more closely match to the luminance value indicated by the image signal of the succeeding frame; and an output step, performed by the output unit, of outputting the image signal of the preceding frame having the luminance value corrected in the correction step.

11. A non-transitory computer-readable storage medium storing a computer program for causing a computer to function as each unit of an image processing apparatus defined in claim 9.

12. An image processing apparatus comprising:

an acquiring unit configured to acquire image signals of successive frames;

a generating unit configured to generate an intermediate image frame to be reproduced between a first image frame and a second image frame in the successive frames, based on image signals of the first and second image frames;

a determining unit configured to determine whether to correct a luminance value indicated by an image signal of the intermediate image frame, based on the luminance value indicated by the image signal of the first image frame and a luminance value indicated by an image signal of the second image frame; and a processing unit configured to correct the luminance value indicated by the image signal of the intermediate image frame to make a luminance corresponding to a value indicated by the image signal of the first image frame more closely match a luminance corresponding to a value indicted by the image signal of the second image frame.

13. The apparatus according to claim 12, wherein in a case where a difference between a corrected luminance value obtained by the processing unit and a luminance value indicated by an image signal of the first image frame is larger than a predetermined value, the processing unit corrects the corrected luminance value of the intermediate image frame so as to be a higher luminance value.

* * * * *